May 5, 1959           T. HAHN           2,884,653
TOOL FEED CONTROL MEANS OPERABLE IN ONE
DIRECTION OF MOVEMENT AND INOPERABLE
IN THE REVERSE DIRECTION
Filed June 30, 1954           2 Sheets-Sheet 1
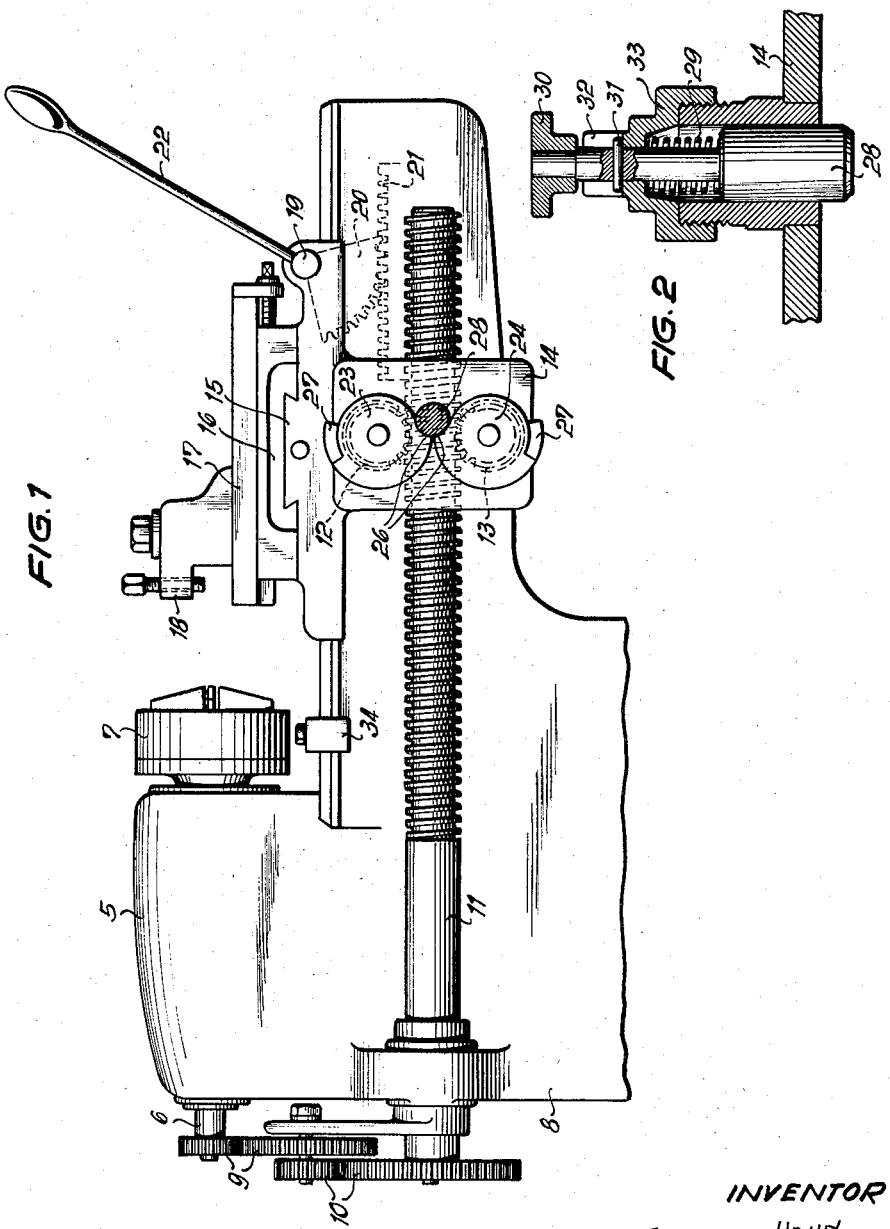
INVENTOR
THEODOR HAHN
BY

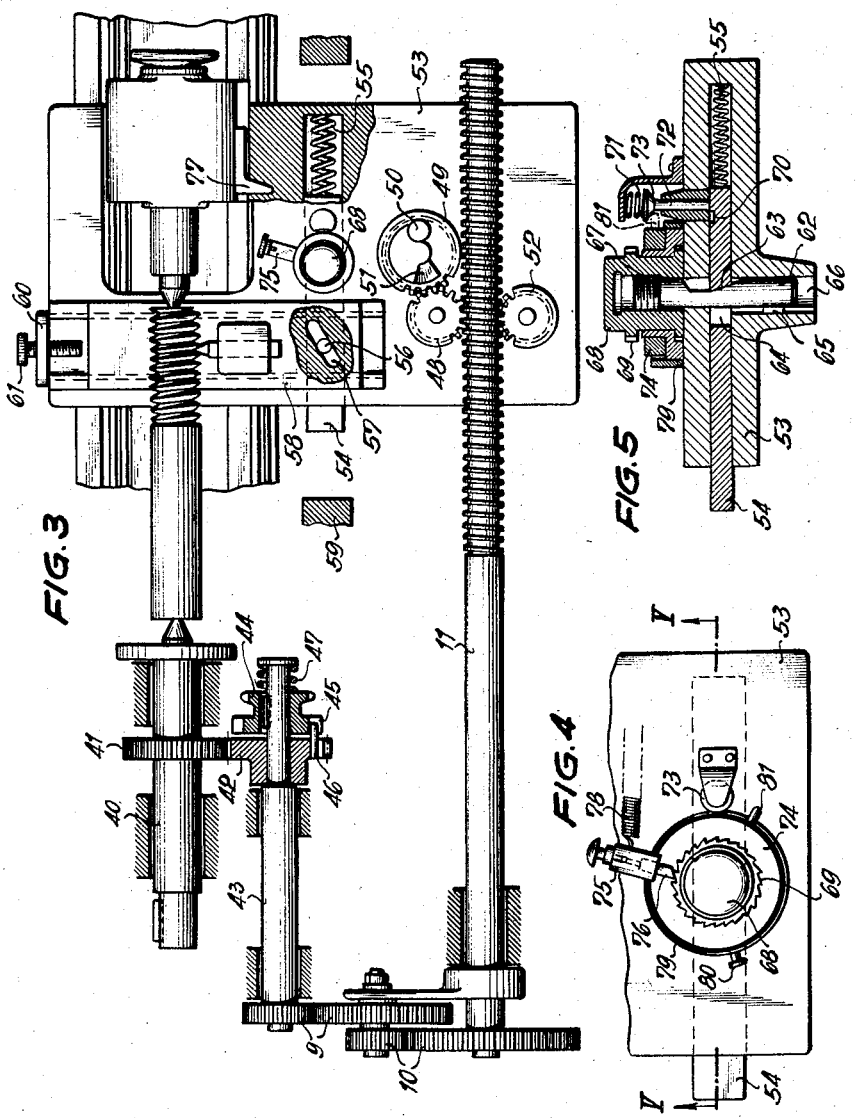

United States Patent Office 2,884,653
Patented May 5, 1959

2,884,653

TOOL FEED CONTROL MEANS OPERABLE IN ONE DIRECTION OF MOVEMENT AND INOPERABLE IN THE REVERSE DIRECTION

Theodor Hahn, Sprockhovel, Westphalia, Germany

Application June 30, 1954, Serial No. 440,459

Claims priority, application Germany July 7, 1953

6 Claims. (Cl. 10—105)

The invention relates to a feeding device especially for machine tools, in which a feeding force is under the influence of the mechanical control of a device independent thereof which moves ahead at the necessary feed speed.

It is well known to analyse mechanically or optically a screw spindle extending in the direction of feed and rotating at the necessary speed and to control accordingly the valves of the hydraulic drive influencing the feed speed of the table. All these feeding arrangements are of intricate design and are therefore only suitable for heavy machine tools which are used for special purposes.

The invention has for its object to produce a feeding device which can be actuated by hand or by some other power and which by accurate regulation of the feed speed can also be used for cutting screw threads and which at the same time is of such simple construction that it can, if desired, be used as ancillary arrangement for already existing machines. This is attained according to the invention in that the device serving for the mechanical control of the feed speed consists of a screw threaded spindle extending in the direction of feed, which, acting as a toothed rack meshes with a toothed wheel mounted on the member pushed forward by an extraneous force, for example on the tool carrier, and the rotary motion of which in the direction coordinated to the feed movement can be locked. The use of a screw threaded spindle extending in the direction of feed, for example the lead screw, in the case of lathes, solely for controlling the feed speed, presents the advantage that the bearings of the spindle are practically free from load and therefore do not wear. Furthermore, the spindle itself, being only subjected to slight stresses, retains its accurate pitch for long periods. The use of some force independent of the control, for example manual force exerted by a hand lever or a hydraulic pressure arrangement, results in a reduction of the necessary working time as compared with the movement of the advanced part by means of a screw spindle, because, primarily, the return movements of the moved part can be carried out as quickly as desired. During the feed movement in which the toothed wheel meshing with the screw spindle is locked against rotation, this wheel, through the intermediary of its engaging teeth, acts as a catch or brake, whereas, during the return movement, it rolls along the spindle without being influenced by the individual movement thereof, because its movement is released for this direction of rotation.

A grip roller locking gear or a pawl locking gear may, for example, be employed as freewheel clutch for the toothed wheel meshing with the screw spindle. These, however, owing to the multiplicity of the possible mutual positions of the intercoupling parts, are open to the objection that arrangement is not readily suitable for example for the production of screw threads because it does not ensure that the screw cutting tool, after the return stroke, will again engage in the rough cut screw thread. This difficulty can be overcome by providing the freewheel clutch with only one engaging position which then clearly determines the relative positions of the working spindle and the control during the entire working operation and thus ensures accurate running in of the thread cutting tool because the toothed wheel cooperating with the screw spindle as driver remains permanently in engagement therewith. This is of particularly great importance for the efficiency of the arrangement because screw thread cutting, which hitherto could only be carried out by experienced workers, now requires neither special technical knowledge nor particular care.

The control intended particularly for screw cutting can have, for example, a toothed wheel which can be set relatively to its carrier, for example, the tool carrier, by means of an abutment device which is operative only in the direction of rotation coordinated to the feed movement and disengages during the return movement. The abutment device will be particularly simple if its member which is pushed forward, that is for example the part mounted on the tool carrier, consists of a shiftable pin which, when the toothed wheel rotates in the sense of the return stroke, is disengaged by an inclined surface on the latter and during the feed, in cooperating with a rigid projection, forms a locking gear. The movable part of the abutment arrangement might, however, also be on the toothed wheel.

So as to relieve the screw spindle from bending deformation which could lead not only to increased wear in the bearings but, by changing the depth of engagement, also to errors in pitch on the workpiece, it is advisable to provide on the opposite sides of the screw spindle two toothed wheels one of which is either utilized solely for supporting or can also serve as parallel controlling member for the other wheel so as to further reduce the wear by reducing the surface pressure on the flanks of the teeth. Instead of an additional toothed wheel a simple supporting roller might also be used and under certain circumstances a supporting member sliding on the outer periphery of the screw spindle.

The arrangement according to the invention for obtaining an accurate feed movement, renders it possible to carry out particularly turning work quickly and accurately. For example, screw threads, particularly in the case of short threads, can be cut in only a fraction of the time required with the known arrangements. Its advantages can be utilized particularly effectively if the incidental times taken up by infeeding the tool cutting the thread or working a surface are reduced to a minimum. In this connection it is of primary importance that the setting back of the tool in the region of the run out of the worked surface, particularly of the thread, is effected automatically in such a manner that even under unfavorable circumstances chip thicknesses are not suddenly encountered at this point which are so great that they would subject particularly hard metal tools to excessively high stresses.

According to another feature of the invention the setting back of the tool can be effected automatically and a gradual clean run out of the surface obtained by controlling the cross-slide by a rod shiftable in the carriage in the direction of movement thereof, which rod cooperates with an abutment with a view to setting back the cross-slide on reaching the run out of the working surface particularly of a screw thread. The operation of the arrangement is therefore not dependent upon the attention of the operator, because the danger of the tool not being raised sufficiently quickly, which was present with the known screw cutting arrangements, no longer exists. This presents the advantage that, as compared with the known arrangements, considerably higher cutting speeds can be employed so that the cutting speeds permissible for hard metal can be fully utilized even in the case of thread cutting. The employment of a setting member which effects the setting back of the cross-slide, that is of the tool, in accordance with the movement of the carriage in the direction of feed, also possesses the advantage that the tool is not retracted suddenly but by a gradual movement so that the worked surface has a particularly clean appearance, particularly in the case of the screw threads.

The efficiency of the arrangement can be still further increased in that the rod acting on the cross-slide is subjected to spring action in the direction of its movement into the position corresponding to the advanced position of the cross-slide and cooperates with a catch which maintains it in its set back position. It is thus possible, for example when cutting a screw thread, to run the carriage into its foremost position and bring it back directly. Here a release of the catch is necessary, which, thanks to the spring arrangement loading the rod, allows the cross-slide to return into the cutting position, and an adjustment to the desired thickness of chip. This can be carried out by hand, but according to another feature of the invention, is preferably effected with the aid of an adjustable stop or abutment determining the longitudinal position of the rod coordinated to the advanced position of the cross-slide. This preferably consists of a slide having a wedge surface and cooperating with an abutment surface on the rod extending transversely to the direction of movement of the rod. Such a slide is preferably set by means of a screw thread and is preferably mounted so that it is vertically shiftable. If desired, some other method of fitting can be employed. Furthermore, it would, for example, be possible to determine the longitudinal position of the slide by means of a wedge surface on an adjusting member.

If a screw nut is used for adjusting the slide it is possible in a simple manner to automatically adjust this through the intermediary of a cut feed mechanism by means of a stop fixed on the machine during the return movement of the carriage. At the same time it is advisable to make the setting stroke of the cut feed mechanism adjustable so as to have a choice for the amount of adjustment. Such automatic setting arrangements might also be provided if the longitudinal position of the slide is influenced by means of a wedge or the like instead of by a screw thread.

For a full automatic adjustment of the tool carrier and cross-slide it is also recommended to make the catch holding the spring loaded rod in the rearward position disengageable depending upon the movement of the setting member of the cut feed mechanism. Providing the disengagement of the catch is effected after the adjustment of the slide a preselection is possible for setting the chip thickness, which presents the advantage that the power required for the adjustment is kept low so that practically no wear takes place on the surfaces determining the adjustment.

With a view to further simplifying the operation of the machine it is advisable to coordinate to the cross-slide an adjustable stop limiting its feed. The effect of such a stop is that the cut cannot exceed the prescribed depth even when the machine is, through carelessness, further actuated after the prescribed depth has been reached.

It is possible, particularly for the production of multiple threads, to introduce between the working spindle and the screw spindle coordinated to the feeding arrangement a dividing clutch which allows the relative positions of the two members to be accurately changed over in a simple manner through predetermined angles, 180° in the case of double threads, 120° in the case of triple threads, and so forth.

In order to obtain maximum service from the machine it is of considerable importance to reduce the idle and incidental times to a minimum, it is advisable, according to yet another feature of the invention, to provide for indirect and not direct locking of the rotary movement of the toothed wheel meshing with the screw spindle and rotatably mounted on the carriage. This is based on the consideration that to obtain the movement relationship between the working spindle and the screw spindle determined by the prescribed feed, it is necessary that the pitch which has actually to be produced merges completely in the generation path of the toothed wheel meshing with the screw spindle which is limited by the abutment positions. It would, it is true, be possible to select this toothed wheel with such a large diameter that practically all pitches which come into question for screw threads, merge smoothly into the circumference of the pitch circle, but in that case there would be considerable idle times which would certainly reduce the efficiency of the works. These difficulties are overcome by the indirect locking of the toothed wheel in that, for example, the toothed wheel meshing with the screw spindle influences at least one change gear which in turn cooperates with a stop locking the rotary movement of the feeding device. A feed control of this type may have a change gear cooperating with a stop which gear meshes directly with the toothed wheel meshing with the screw spindle. It would also be possible to provide a rotary disk cooperating with a stop and to drive this disk by the toothed wheel meshing with the screw spindle or a shaft coordinated thereto through the intermediary of a change wheel or system of change gears.

An embodiment of the invention is illustrated by way of example in the accompanying drawings, in which:

Fig. 1 is a side elevation, partly in section, of a lathe equipped for screw cutting;

Fig. 2 shows a detail of Fig. 1 on a larger scale;

Fig. 3 is a diagrammatic view showing the drive of the cross-slide of the lathe equipped for screw cutting;

Fig. 4 is a top plan view of a setting arrangement according to the invention, and Fig. 5 is a section on line V—V of Fig. 4.

In the headstock 5 of the lathe a working spindle 6 is mounted in known manner and carries a three-jaw chuck 7 for receiving blanks to be machined. The working spindle 6 is driven for example by a motor arranged in the machine frame 8 of the lathe through the intermediary of a gearing not shown in the drawings. The number of revolutions of the working spindle is selectable. A screw spindle 11 arranged like a lead screw is coupled with the working spindle 6 by pairs of change or transmission gears 9 and 10, extends in the longitudinal direction of the machine frame, and is rotatable and secured against longitudinal displacement. Toothed wheels 12 and 13, rotatable on the apron 14 of a carriage 15, engage this screw spindle 11 from opposite sides. The carriage 15 carries in known manner a cross-slide 16 and thereon a longitudinally shiftable slide 17 on which a holder 18 for a thread cutter, chaser or the like is mounted. The feed power is produced by means of a double lever pivotable about a pin 19 on the carriage 15, one arm of this lever being constructed as a toothed segment 20 engaging a toothed rack 21 on the machine frame 8 while the other arm 22 is constructed as a hand lever.

The toothed wheels 12 and 13 are provided with disks 23 and 24 constructed as sectors and forming abutment faces 26 on one side and having inclined butting faces 27 on the other side. A pin 28 projecting transversely to the longitudinal direction of the screw spindle 11 and longitudinally shiftable in the apron 14 of the carriage 15, cooperates with the disks 23 and 24 and, as shown in Fig. 2, is loaded by a spring 29 and carries a handle 30. The pin 28 is secured against rotation by a cross pin 31 extending through its head and guided in a slot 32 of a sleeve 33 on the apron 14 and can be fixed in a retracted position by pulling and turning. An adjustable stop 34 on the machine frame 8 serves for limiting the feed movement of the carriage 15.

The dependency between the movement of the working spindle 6 and that of the screw spindle 11 which is necessary for cutting screw threads is ensured by the pairs of change or transmission gears 9 and 10 connecting the two parts and can be adapted to the screw pitch actually required by the choice of the ratio of transmission. The feed of the carriage 15 carrying the thread cutter is effected by actuating the double lever 20, 22. The feed speed attainable thereby is limited by the fact that the toothed wheels 12 and 13 engaging the screw spindle 11 are held against rotation by the abutment faces 26 of the segment-shaped disks 23 and 24 connected with the wheels bearing against the free end of the pin 28. The teeth in mesh with the screw spindle 11 act as braking members which allow the carriage 15 to be fed by means of the double lever 20, 22 not above the requisite speed, irrespective of how great a force is applied to the double lever 20, 22. The feed movement will be finished when the carriage 15 comes into contact with the stop 34. The thread cutter must then be set back which can easily be effected, for example, by a known quick adjustment. The carriage 15 can then be moved back as quickly as desired by means of the double lever 20, 22. During this movement the toothed wheels 12, 13 roll on the screw spindle 11 independently of the rotation thereof. The pin 28 does not prevent the rotation of the toothed wheels 12 and 13 and therefore the return movement because the inclined faces 27 of the segment-shaped disks 23 and 24 run under the front end face of the pin, so that at each rotation of the toothed wheels the pin is moved into its retracted position against the action of the spring 29. At the next forward movement of the carriage 15 with the aid of the double lever 20, 22 the abutment faces 26 of the disks 23 and 24 connected to the toothed wheels 12 and 13 bear against the pin 28 once more and thus limit the attainable feed speed to the value determined by the rotation of the screw spindle 11. As the toothed wheels 12 and 13 remain in engagement with the screw spindle 11 during all the movements there is no fear of missing the entrance to the thread.

In the form of construction of a lathe equipped for thread cutting illustrated in Figs. 3 to 5, which differs from the example illustrated in Figs. 1 and 2, an automatic withdrawal of the carriage is provided. A working spindle 40 in this case drives a toothed wheel 42 rotatable on a shaft 43 by means of a pinion 41. On the front end of this shaft a driver or entrainment means 44 is shiftably mounted and secured against rotation, and provided with radially directed slots 45 distributed around its circumference, which slots engage selectively an axially parallel pin 46 fixed in the toothed wheel 42. The driver 44 is under the action of a helical pressure spring 47 which presses it towards the toothed wheel 42. The shaft 43 drives the screw spindle 11 through the intermediary of the pairs of transmission gears 9 and 10 the screw spindle being rotatably mounted on the machine and secured against longitudinal displacement. A toothed wheel 48 engages in the thread of the screw spindle 11 and meshes with an exchangeable toothed wheel 49 to which a stop 50 is coordinated which is disengageable and automatically disengages during the return movement of the carriage through the intermediary of an inclined surface 51, the interaction between the parts 49, 50, 51 being the same as that of the parts 24, 28, 27 described above. A toothed wheel 52 arranged symmetrically to the toothed wheel 48 and meshing with the screw spindle 11 serves in this case merely to take up the bending forces. Slidably mounted in a carriage 53 of the machine is a rod 54 loaded by a helical pressure spring 55. The rod 54 carries a pin 56 which engages in an inclined slot 57 in a cross-slide 58. An abutment 59 fixed on the machine is arranged in the path of the free end of the rod 54. The carriage 53 carries a cam 60 in which a screw 61 is arranged which forms an adjustable stop limiting the advance of the cross-slide 58. The longitudinal position of the rod 54 loaded by the spring 55 is, as shown particularly in Fig. 5, determined by a vertically shiftable pin 62 provided with a wedge-shaped reduced portion 63 which pin 62 extends through an aperture 64 in the rod 54. The pin 62 is secured against rotation by an adjusting key 65 and accommodated in a bore 66 in the carriage. It has on its upper end a screw thread 67 which engages a cap-shaped nut 68 provided with ratchet teeth 69 on its circumference. The rod 54 also has a recess 70 to which a drop-in pin 72 is coordinated which carries on its upper end a conical plate 73 and is loaded by a spring 71. An arm 75 mounted on a ring 74 and in which a spring-loaded pawl 76 is shiftable, serves for adjusting the nut 68. A stop 77 fixed on the machine is arranged in the path of the arm 75 so that the latter, upon rightward movement of the carriage 53, is turned in counter-clockwise direction. This arm 75 is loaded by a spring 78 in its initial position in the sense of a backward movement of the ratchet mechanism, i.e., the spring 78 biases the ring 74 in a clockwise direction. A ring 79 carrying on its upper side a stop serves for controlling the depth of the cut, as will be described below, and can be fixed in any desired angular position by means of a set screw 80. The ring 74 carrying the arm 75 is also provided with a pin 81 which can run under the conical plate 73 of the drop-in pin 72 and lift it out of engagement.

According to the selection and the fitting of the exchangeable toothed wheel 49 for the pitch of the thread to be produced, the tool holder on the cross-slide is so adjusted that the tool just touches the surface corresponding to the external diameter of the thread to be produced. After the disengagement of the pawl 76 the nut 69 is set so that the pin 62 is in its uppermost position. The feed of the tool actually required is then selected by adjusting the ring 79. The cutting depth of the tool is also limited by means of the screw 61. The stops 59 and 77 also need adjusting. The machine is then set ready for work.

After starting up, the spindle 11 rotates with the workpiece. The carriage is moved by some extraneous force, that is either by hand power or by, for example, hydraulic pressure, so that the toothed wheel 48, whilst maintaining the abutment position of the change wheel 49, bears against the front flanks of the thread of the spindle 11. On reaching the end point of the thread the rod 54 is engaged by the stop 59 and is moved back under the action of the spring 55 and at the same time carries along the cross-slide through the intermediary of the parts 56, 57. The cross-slide is locked in its retracted position by the drop-in pin 72 engaging the rod 54. The carriage 53 can be moved back independently of the movement of the spindle 11 because no locking exists through the toothed wheels 48, 49 in the sense in which this carriage moves. Shortly before the carriage reaches its initial position the arm 75 of the ring 74 comes into contact with the stop 77 fixed on the machine and the pawl 76 connected to it turns the nut 68 through an adjusted distance. The adjustment of the pin 62 can therefore be carried out without difficulty because the rod 54 is caught by the parts 70, 72, that is, does not bear against the pin 62, when the carriage has completed its feed. During the last portion of the movement of the ring 74 the drop-in pin 72 is disengaged by the pin 81 so that the rod 54 springs forward under the action of the spring 55 and thereby brings the cross-slide into its cutting position through the intermediary of the parts 56, 57, which position is changed relatively to the position during the preceding stroke by the amount determined by the adjustment of the pin 62 which has taken place in the meantime. This sequence of operations is repeated with each working stroke. The setting movement of the cross-slide 58 is limited by the abutment screw 61 when the desired depth of thread has been reached.

The increase in the depth of cut made by the work tool, i. e., the distance which the cutting tool will be moved toward the axis of rotation of the work piece upon each to and fro movement of the carriage 53, can be preselected by adjusting the angular position of the ring 79. As set forth above, the ring 79 carries on its upper side a stop, and this stop is abutted by the arm 75 carried by the ring 74, the latter being biased for clockwise movement, as viewed in the drawings, by the spring 78. Thus, by varying the angular position of the ring 79 together with its stop, the initial position of the arm 75 and the ring 74, and consequently the angular distance which the ring will be rotated upon each rightward movement of the carriage 53, can be pre-selected, inasmuch as the right end position of the carriage 53 is limited. As a result, the linear distance which the slide 62 is advanced each time can be preselected, and this, in turn, controls the increase in the depth of the cut made by the cutting tool.

As already mentioned the construction illustrated only represents an example of how the invention can be performed and the invention is not confined thereto. Many other forms of construction and applications are possible. Instead of a thread cutter or tracer, a milling cutter might also be used. Possible constructions for the free-wheel coupling coordinated to the toothed wheels 12, 13 and 48, 49 have already been described. The arrangement can be similarly employed for other machines, for example, milling machines, where by using climb milling particularly clean surfaces can be produced as the feed is absolutely uniform. Other purposes for which the arrangement could be used to advantage are drilling arrangements and particularly drilling machines. The feeding power, which in the example illustrates is effected by the double lever 20, 22 might also be derived from a hydraulically operated pressure arrangement. The feeding power can, in known manner, be greater than the power requirement, in which case the arrangement according to the invention exerts a breaking effect. In principal, however, it would also be possible to limit the feeding power to a value below that of the requirement in which case the control would have to provide the lacking amount. However, an automatic freewheel locking could not be used in this case for the toothed wheel meshing with the screw spindle. The automatic control of the part to be readjusted after each working stroke is also applicable for other machines in which several working strokes are carried out with progressive setting of the tool or the like. The parts 56, 57 transmitting the movement of the rod 54 to the cross-slide 58 might be modified in many ways from that chosen. The means for setting the pin 62 determining the thickness of chip may also be different from those in the example shown. The limitation of the maximum advance of the cross-slide might be arranged in the range of the screw pin 62. Instead of a shiftable pin controlling the advance of the tool, other means might be provided. The adaptation of the feeding arrangement to screw threads of different pitches is obviously possible by exchanging the toothed wheel directly meshing with the screw spindle. Furthermore several stops which come into operation selectively might be coordinated to the toothed wheel.

I claim:

1. In a machine tool, in combination, support means defining a work zone; work tool means mounted on said support means for movement relative thereto toward and away from said work zone; first moving means for moving said work tool means relative to said support means toward and away from said work zone; and control means independent of said first moving means for limiting the rate at which said first moving means move said work tool means toward said work zone to a predetermined rate while permitting said first moving means to move said work tool means away from said work zone at a rate in excess of said predetermined rate, said control means including worm screw means rotatably mounted on said support means and extending in the direction of movement of said work tool means, second moving means for rotating said worm screw means at a control rate which is a function of said predetermined rate, at least one gear member rotatably mounted on said work tool means and in meshing engagement with said worm screw means, and means for preventing continuous rotation of said gear member in that sense in which it would rotate if said first moving means were to seek to move said work tool means toward said work zone at a rate greater than said predetermined rate.

2. In a machine tool, in combination, support means defining a work zone; work tool means mounted on said support means for movement relative thereto toward and away from said work zone; first moving means for moving said work tool means relative to said support means toward and away from said work zone; and control means independent of said first moving means for limiting the rate at which said first moving means may move said work tool means toward said work zone to a predetermined rate while permitting said first moving means to move said work tool means away from said work zone at a rate in excess of said predetermined rate, said control means including worm screw means rotatably mounted on said support means and extending in the direction of movement of said work tool means, second moving means for rotating said worm screw means at a control rate which is a function of said predetermined rate, at least one gear member rotatably mounted on said work tool means and in meshing engagement with said worm screw means, and blocking means for preventing continuous rotation of said gear member in that sense in which it would rotate if said first moving means were to seek to move said work tool means toward said work zone at a rate greater than said predetermined rate, said blocking means including combined stop and cam means comprising at least one stop portion and at least one cam portion on said gear member and rotatable therewith and resilient detent means on said work tool means and adapted to project into the path of said combined stop and cam means when the same rotates with said gear member, said stop portion being adapted to engage said detent means before said gear member has rotated more than a predetermined portion of one revolution in said sense thereby preventing continuous rotation of said gear member in said sense and said cam portion being adapted to engage said detent means and move the same exterior of said path thereby permitting free rotation of said gear member in the opposite sense, thereby permitting said first moving means to move said work tool means away from said work zone at a rate greater than said predetermined rate.

3. The combination defined in claim 2 wherein said resilient detent means includes an engaging member mounted on said work tool means for movement between a projecting position wherein said engaging member is in said path and a retracted position wherein said engaging member is exterior of said path, and biasing means for biasing said engaging member into said projecting portion.

4. In a machine tool, in combination, support means defining a work zone; work tool means mounted on said support means for movement relative thereto toward and away from said work zone; first moving means for moving said work tool means relative to said support means toward and away from said work zone; and control means independent of said first moving means for limiting the rate at which said first moving means may move said work tool means toward said work zone to a predetermined rate while permitting said first moving means to move said work tool means away from said work zone at a rate in excess of said predetermined rate, said control means including worm screw means rotatably mounted on said support means and extending in the direction of movement of said work tool means, second moving means for rotating said worm screw means at a control rate which is a function of said predetermined rate, two gear members rotatably mounted on said work tool means and in meshing engagement with diametrically opposite sides of said worm screw means, respectively, and means for preventing continuous rotation of each of said gear members in that sense in which they would rotate if said first moving means were to seek to move said work tool means toward said work zone at a rate greater than said predetermined rate.

5. In a machine tool, in combination, support means defining a work zone; work tool means mounted on said support means for movement relative thereto toward and away from said work zone; first moving means for moving said work tool means relative to said support means toward and away from said work zone; and control means independent of said first moving means for limiting the rate at which said first moving means may move said work tool means toward said work zone to a predetermined rate while permitting said first moving means to move said work tool means away from said work zone at a rate in excess of said predetermined rate, said control means including worm screw means rotatably mounted on said support means and extending in the direction of movement of said work tool means, second moving means for rotating said worm screw means at a control rate which is a function of said predetermined rate, a first gear member rotatably mounted on said work tool means and in meshing engagement with said worm screw means, a second gear member rotatably mounted on said work tool means and in meshing engagement with said first gear member, and blocking means for preventing continuous rotation of said second gear member in that sense in which it would be rotated by said first gear member if said first moving means were to seek to move said work tool means toward said work zone at a rate greater than said predetermined rate.

6. In a machine tool, in combination, support means defining a work zone; work tool means mounted on said support means for movement relative thereto toward and away from said work zone; first moving means for moving said work tool means relative to said support means toward and away from said work zone; and control means independent of said first moving means for limiting the rate at which said first moving means may move said work tool means toward said work zone to a predetermined rate while permitting said first moving means to move said work tool means away from said work zone at a rate in excess of said predetermined rate, said control means including worm screw means rotatably mounted on said support means and extending in the direction of movement of said work tool means, second moving means for rotating said worm screw means at a control rate which is a function of said predetermined rate, a first gear member rotatably mounted on said work tool means and in meshing engagement with said worm screw means, a second gear member rotatably mounted on said work tool means and in meshing engagement with said first gear member, and blocking means for preventing continuous rotation of said second gear member in that sense in which it would be rotated by said first gear member if said first moving means were to seek to move said work tool means toward said work gone at a rate greater than said predetermined rate, said blocking means including combined stop and cam means comprising at least one stop portion and at least one cam portion on said second gear member and rotatable therewith and resilient detent means on said work tool means and adapted to project into the path of said combined stop and cam means when the same rotates with said gear member, said stop portion being adapted to engage said detent means before said second gear member has rotated more than a predetermined portion of one revolution in said sense and said cam portion being adapted to engage said detent means and move the same exterior of said path thereby permitting free rotation of said second gear member in the opposite sense, thereby permitting said first moving means to move said work tool means away from said work zone at a rate greater than said predetermined rate.

References Cited in the file of this patent

UNITED STATES PATENTS

| | | |
|---|---|---|
| 43,311 | Jillson | June 28, 1864 |
| 447,713 | Sponsel | Mar. 3, 1891 |
| 772,706 | Driver | Oct. 18, 1904 |
| 796,171 | Ambrose | Aug. 1, 1905 |
| 2,367,492 | Fickett | Jan. 16, 1945 |
| 2,372,427 | Johnson | Mar. 27, 1945 |
| 2,437,603 | Hornfeck | Mar. 9, 1948 |
| 2,573,628 | Van Dyn | Oct. 30, 1951 |
| 2,601,157 | Lelan | June 17, 1952 |
| 2,660,737 | Escure | Dec. 1, 1953 |
| 2,677,296 | Morgan | May 4, 1954 |